US009053306B2

(12) United States Patent
Yoshigaki et al.

(10) Patent No.: US 9,053,306 B2
(45) Date of Patent: Jun. 9, 2015

(54) AUTHENTICATION SYSTEM, AUTHENTICATION SERVER, SERVICE PROVIDING SERVER, AUTHENTICATION METHOD, AND COMPUTER-READABLE RECORDING MEDIUM

(75) Inventors: Shinsuke Yoshigaki, Fukuoka (JP); Koji Shiotani, Fukuoka (JP)

(73) Assignee: NEC Solution Innovators, Ltd., Tokyo (JP)

( * ) Notice: Subject to any disclaimer, the term of this patent is extended or adjusted under 35 U.S.C. 154(b) by 108 days.

(21) Appl. No.: 13/991,464

(22) PCT Filed: Nov. 30, 2011

(86) PCT No.: PCT/JP2011/077692
§ 371 (c)(1),
(2), (4) Date: Jun. 26, 2013

(87) PCT Pub. No.: WO2012/081404
PCT Pub. Date: Jun. 21, 2012

(65) Prior Publication Data
US 2013/0269007 A1  Oct. 10, 2013

(30) Foreign Application Priority Data

Dec. 16, 2010 (JP) ................................. 2010-280637

(51) Int. Cl.
*G06F 21/31* (2013.01)
*H04L 9/32* (2006.01)
*H04L 29/06* (2006.01)

(52) U.S. Cl.
CPC .............. *G06F 21/31* (2013.01); *H04L 9/3226* (2013.01); *H04L 63/126* (2013.01); *H04L 63/083* (2013.01); *G06F 2221/2115* (2013.01)

(58) Field of Classification Search
USPC ............................................................ 726/5
See application file for complete search history.

(56) References Cited

U.S. PATENT DOCUMENTS 7,228,417 B2 * 6/2007 Roskind ......................... 713/168
(Continued)

FOREIGN PATENT DOCUMENTS

| JP | 2003-338823 A | 11/2003 |
| JP | 2008-83859 A | 4/2008 |
| JP | 2009-258917 A | 11/2009 |
| JP | 2009-282561 A | 12/2009 |

(Continued)

OTHER PUBLICATIONS

International Search Report for PCT/JP2011/077692 dated Dec. 27, 2011.

*Primary Examiner* — Beemenet Dada
(74) *Attorney, Agent, or Firm* — Sughrue Mion, PLLC

(57) ABSTRACT

An authentication system 100 includes an authentication server 10 and a service providing server 20 for providing a service. When a user requests authentication, the authentication server lets the user input login information, transmits the login information to the service providing server 20, and calculates a first hash value from the login information using a hash function. The service providing server 20 calculates a second hash value from the login information using the same hash function if the login information transmitted from the authentication server 10 matches information that is registered in advance. The authentication server 10 establishes a session with a terminal 30 if the first hash value and the second hash value match each other.

14 Claims, 6 Drawing Sheets

(56) References Cited

U.S. PATENT DOCUMENTS

| | | | |
|---|---|---|---|
| 7,251,827 B1 * | 7/2007 | Guo et al. | 726/8 |
| 2003/0033545 A1 * | 2/2003 | Wenisch et al. | 713/202 |
| 2008/0077789 A1 | 3/2008 | Gondo | |

FOREIGN PATENT DOCUMENTS

| | | |
|---|---|---|
| JP | 2010-61302 A | 3/2010 |
| JP | 2010-68460 A | 3/2010 |
| JP | 2010-191801 A | 9/2010 |

* cited by examiner

FIG. 2

| User ID | Service ID | Session ID |
|---|---|---|
| Blackbird | S11AY001 | SS000231 |
| Yassy | S22BY001 | SS000232 |
| Redstone | S33CY001 | SS000233 |
| ⋮ | ⋮ | ⋮ |

FIG. 3

| User ID | Employee ID | Password |
|---|---|---|
| Blackbird | 104045 | AAA11 |
| Yassy | 104085 | ABB34 |
| Redstone | 104063 | B1C69 |
| ... | ... | ... |

AUTHENTICATION SYSTEM, AUTHENTICATION SERVER, SERVICE PROVIDING SERVER, AUTHENTICATION METHOD, AND COMPUTER-READABLE RECORDING MEDIUM

CROSS REFERENCE TO RELATED APPLICATIONS

This application is a National Stage of International Application No. PCT/JP2011/077692 filed Nov. 30, 2011, claiming priority based on Japanese Patent Application No. 2010-280637 filed Dec. 16, 2010, the contents of all of which are incorporated herein by reference in their entirety.

TECHNICAL FIELD

The present invention relates to an authentication system, an authentication server, a service providing server, an authentication method, and a computer-readable recording medium that are used in cloud computing.

BACKGROUND ART

In recent years, the use of computer known as "cloud computing" has increased. In cloud computing, various types of application services and hardware resources such as servers are provided to users over the Internet.

As long as a user has access to the Internet, the user can receive services provided by cloud computing (cloud computing services) without regard to any service infrastructure at that time. Patent Document 1 discloses a system for providing a cloud computing service (hereinafter, referred to as a "cloud system").

The cloud system disclosed in Patent Document 1 includes an authentication server and a plurality of service providing servers. According to the cloud system of Patent Document 1, once logged in, the user can receive services that are provided by the service providing servers without regard to the servers. Hereinafter, this cloud system is described.

When the user logged in, authentication processing by the authentication server is first performed. Specifically, the user creates, using a terminal, a request for requesting a service, encrypts the request, and then sends the encrypted request to the authentication server. The authentication server performs decryption processing that uses the terminal ID of the user as a decryption key, and accepts the login from the terminal in the case of successful decryption. After having accepted the user login, the authentication server invokes a server that provides a tour reservation service (hereinafter referred to as a "tour reservation server").

The invoked tour reservation server displays a tour reservation page on the user's screen and lets the user make a reservation. When the user has made the reservation, the tour reservation server then invokes servers that provide a hotel reservation service and a restaurant reservation service, and lets the user make a hotel reservation and a restaurant reservation. In this way, the user can receive services with a single login.

Also, a company that adopts cloud computing can create a necessary environment in a very short time and at a low cost compared to a company that does not adopt cloud computing. Accordingly, adoption of cloud computing is increasing among companies.

CITATION LIST

Patent Document

Patent Document 1: JP 2010-191801A

DISCLOSURE OF THE INVENTION

Problem to be Solved by the Invention

Meanwhile, companies must themselves manage data that they do not want to be managed by another company, requiring that an intra-company system cooperate with a cloud system while ensuring security. For example, a configuration is possible such that access to the intra-company system from the cloud system is permitted when the authentication server has performed authentication using the technology disclosed in Patent Document 1.

However, since the cloud system disclosed in Patent Document 1 uses the terminal ID of the user as a decryption key at the time of authentication, the intra-company system is not sufficiently secure. Also, given that the authentication server is located outside the company, it is desired to configure a sufficiently secure system when an intra-company system cooperates with the cloud system.

It is an exemplary object of the present invention to solve the above-described problem and to provide an authentication system, an authentication server for use in the authentication system, a service providing server, an authentication method, and a program that enable security between an authentication server and a server for providing a service to be enhanced.

Means for Solving the Problem

In order to attain the above-mentioned object, an authentication system according to an aspect of the present invention includes: an authentication server that performs authentication of a user via a terminal and a service providing server that provides the user with a service via the terminal, wherein the authentication server is configured to let the user input login information via the terminal when the user requests the authentication via the terminal, to transmit to the service providing server the login information that was input, and to calculate a first hash value from the login information using a hash function, the service providing server is configured to determine whether or not the login information transmitted from the authentication server matches information that is registered in advance, and to calculate a second hash value from the login information using the same hash function if the login information matches the information registered in advance, and the authentication server establishes a session with the terminal if the first hash value and the second hash value match each other.

In order to attain the above-mentioned object, an authentication server according to an aspect of the present invention is directed to an authentication server that performs, via a terminal, authentication of a user who requests provision of a service from a service providing server, the authentication server including: an information input unit configured to let the user input login information via the terminal when the user requests the authentication via the terminal; a transmitting unit configured to transmit to the service providing server the login information that was input; a hash processing unit configured to calculate a first hash value from the login information using a hash function; a session establishing unit configured to establish a session with the terminal, wherein, when the service providing server has calculated a second hash value on the basis of the transmitted login information using the same hash function on the condition that the login information matches information that is registered in advance, the hash processing unit determines whether or not the first hash value and the second hash value match each other, the session establishing unit establishes the session if the session processing unit determines that the first hash value and the second hash value match each other.

In order to attain the above-mentioned object, a service providing server according to an aspect of the present invention is directed to a service providing server that provides a user with a service via a terminal when an authentication server has established a session with the terminal, the service providing server including: a login information determination unit configured to determine, when login information that was input via the terminal has been transmitted from the authentication server, whether or not the login information matches information that is registered in advance; a hash value calculating unit configured to calculate a hash value from the login information using a hash function if the login information determination unit determines that the login information matches the information registered in advance; and a service providing unit configured to provide the user with a service via the terminal when the authentication server has established a session with the terminal on the condition that the hash value calculated by the hash value calculating unit matches a hash value that is calculated by the authentication server from the login information using the same hash function.

In order to attain the above-mentioned object, an authentication method according to an aspect of the present invention is directed to an authentication method using an authentication server that performs authentication of a user via a terminal, and a service providing server that provides the user with a service via the terminal, the method including the steps of (a) the authentication server letting the user input login information via the terminal when the user requests the authentication via the terminal; (b) the authentication server transmitting to the service providing server the login information that was input; (c) the authentication server calculating a first hash value using a hash function from the login information that was input; (d) the service providing server determining whether the login information matches information that is registered in advance, and calculating a second hash value from the login information using the same hash function if the login information matches the information registered in advance; and (e) the authentication server establishing a session with the terminal if the first hash value calculated in step (c) matches the second hash value calculated in step (d).

In order to attain the above-mentioned object, a first computer-readable recording medium according to an aspect of the present invention is directed to a computer-readable recording medium having recorded therein a program for causing a computer to perform, via a terminal, authentication of a user who requests a service from a service providing server, the program including instructions for causing the computer to execute the steps of (a) letting the user input login information via the terminal when the user requests the authentication via the terminal; (b) transmitting to the service providing server the login information that was input in step (a); (c) calculating a first hash value using a hash function from the login information that was input in step (a); (d) determining, when the service providing server has calculated a second hash value on the basis of the transmitted login information using the same hash function on the condition that the login information matches information that is registered in advance, whether or not the first hash value calculated in step (c) and the second hash value calculated by the service providing server match each other; and (e) establishing a session with the terminal if it is determined in step (d) that the first hash value and the second hash value match each other.

In order to attain the above-mentioned object, a second computer-readable recording medium according to an aspect of the present invention is directed to a computer-readable recording medium having recorded therein a program for causing a computer to provide a user with a service via a terminal when an authentication server has established a session with the terminal, the program including instructions for causing the computer to execute the steps of: (a) determining, when login information that was input via the terminal has been transmitted from the authentication server, whether or not the login information matches information that is registered in advance; (b) calculating a hash value from the login information using a hash function if it is determined in step (a) that the login information matches the information registered in advance; and (c) providing the user with a service via the terminal when the authentication server has established a session with the terminal on the condition that the hash value calculated in the step (b) matches a hash value that is calculated by the authentication server from the login information using the same hash function.

Effects of the Invention

With the above-described features, the present invention can enhance security between an authentication server and a server for providing a service.

BRIEF DESCRIPTION OF THE DRAWINGS

FIG. 2 is a diagram showing an example of a table for managing service IDs, user IDs, and session IDs for use in the present embodiment in association with each other.

FIG. 3 is a diagram showing an example of a table for managing user IDs, passwords, and other IDs for use in the present embodiment.

DESCRIPTION OF EMBODIMENT

Embodiment

Hereinafter, an authentication system, an authentication server, a service providing server, an authentication method, and a program according to an embodiment of the present invention will be described, with reference to FIGS. 1 to 4.

System Configuration

Figure 1:
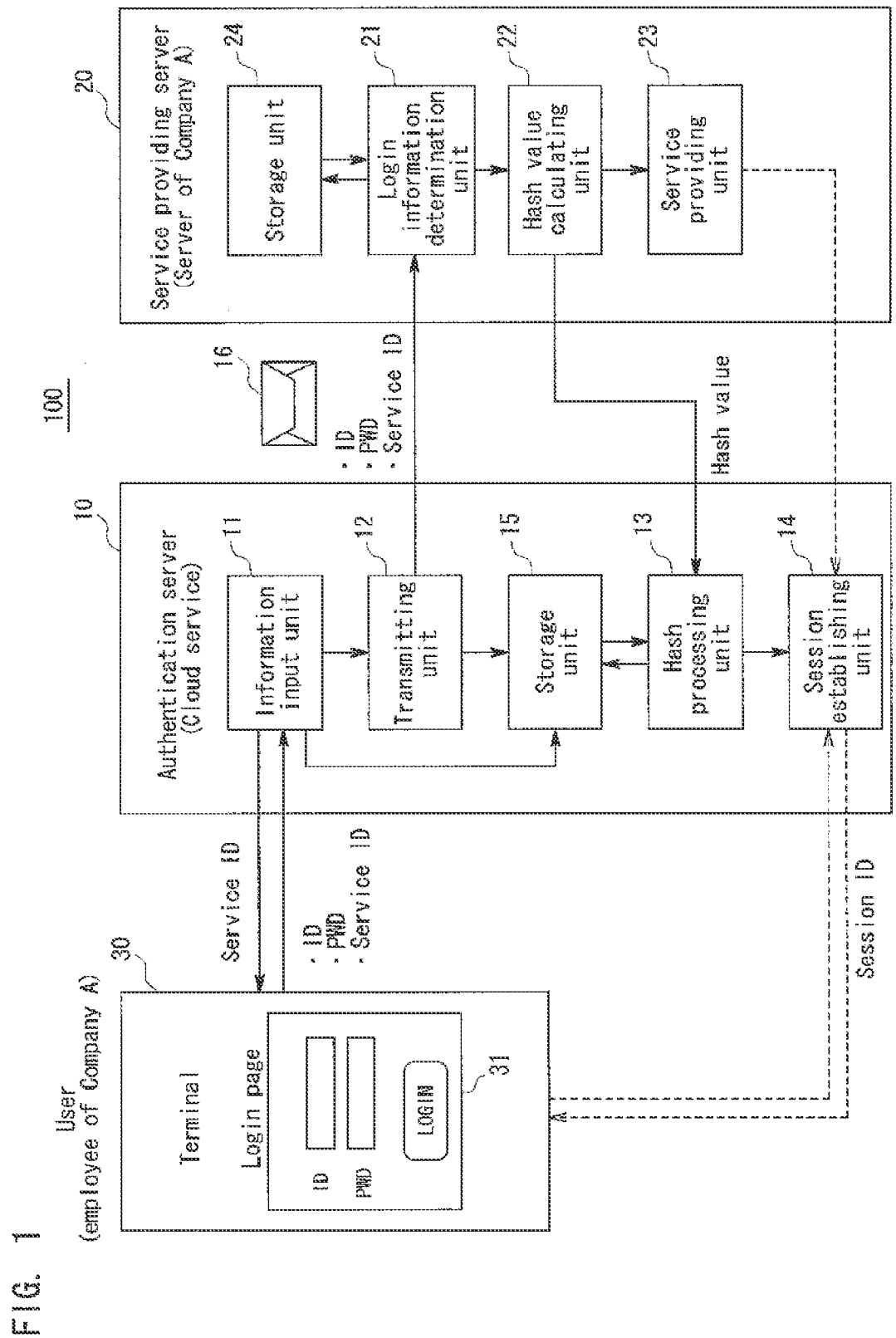
FIG. 1 is a block diagram showing configurations of an authentication system, an authentication server, and a service providing server according to an embodiment of the present invention.

First, configurations of the authentication system, the authentication server, and the service providing server of the present embodiment will be described, with reference to FIGS. 1 to 3. FIG. 1 is a block diagram showing configurations of the authentication system, the authentication server, and the service providing server of the embodiment of the present invention.

As shown in FIG. 1, an authentication system 100 of the present embodiment includes an authentication server 10 and a service providing server 20. The authentication server 10 and the service providing server 20 are connected to each other via a network such as the Internet (not shown in FIG. 1). Also, a terminal 30 of a user is connected to the authentication server 10 via the network. Note that although only a single terminal 30 is shown in the example of FIG. 1, the number of the terminal is not limited in the present embodiment.

Also, as shown in FIG. 1, the authentication server 10 includes an information input unit 11, a transmitting unit 12, a hash processing unit 13, and a session establishing unit 14. With such a configuration, the authentication server 10 performs via the terminal 30 authentication of a user who requests the service providing server 20 to provide a service.

When the user requests the authentication via the terminal 30, the information input unit 11 lets the user input login information via the terminal 30. In the present embodiment, the information input unit 11 displays a login page 31 on a display screen of the terminal 30 and lets the user input, as the login information, a user identifier (user ID) and a password on the login page 31.

The transmitting unit 12 transmits the input login information to the service providing server 20. The hash processing unit 13 calculates a first hash value from the login information using a hash function. When the service providing server 20 calculates a second hash value after the login information has been transmitted to the service providing server 20, as will be described below, the hash processing unit 13 then determines whether or not the first hash value, which was calculated by the hash processing unit 13 itself, and the second hash value match each other.

If the hash processing unit 13 determines that the first hash value and the second hash value match each other, the session establishing unit 14 issues a session ID and establishes a session with the terminal 30. Also, the session establishing unit 14 transmits the session ID to the terminal 30. The terminal 30 can receive a service from the service providing server 20 by using the session ID.

Also, as shown in FIG. 1, the service providing server 20 includes a login information determination unit 21, a hash value calculating unit 22, and a service providing unit 23. With such a configuration, the service providing server 20 provides the user with a service via the terminal 30 when the authentication server 10 has established a session with the terminal 30.

When the login information that was input via the terminal 30 has been transmitted from the authentication server 10, the login information determination unit 21 determines whether or not the login information matches information that is registered in advance.

If the login information determination unit 21 has determined that they match each other, then the hash value calculating unit 22 calculates the second hash value from the login information using a hash function. Note that the hash function that is used for the calculation of the first hash value and the hash function that is used for the calculation of the second hash value may be the same hash function. In the present embodiment, the hash function that is used is not specifically limited.

The service providing unit 23 provides the user with a service via the terminal 30 when the session establishing unit 14 of the authentication server 10 has established a session with the terminal 30 on the condition that the first hash value and the second hash value match each other. An example of the services that are provided is an information providing service for providing various types of information such as inventory management information and intra-company information.

As described above, in the authentication system 100 of the present embodiment, the authentication server 10 and the service providing server 20 individually calculate hash values on the basis of the login information. The terminal 30 can receive a service from the service providing server 20 only if the two hash values match each other. Therefore, according to the present embodiment, an enhancement of security between the authentication server 10 and the service providing server 20 is achieved.

Hereinafter, the configurations of the authentication system 100, the authentication server 10, and the service providing server 20 of the present embodiment will further specifically be described, with reference to FIGS. 2 and 3, in addition to FIG. 1.

Note that, in the present embodiment, the terminal 30 for use by the user may be an information device with a communication facility such as a personal computer, a cellular telephone, or a smart phone, and is not specifically limited. Note further that, in the following description, the service providing server 20 is an internal server of a company (for example, a server of Company A), and the authentication server 10 is a server for performing cloud computing (a server provided by a company other than Company A). The user is an employee of Company A.

As shown in FIG. 1, the authentication server 10 in the present embodiment further includes a storage unit 15, and the information input unit 11 stores the input login information in the storage unit 15. The hash processing unit 13 calculates the first hash value from the login information stored in the storage unit 15.

Also, the hash processing unit 13 deletes the stored login information from the storage unit 15, at the same time as or after the calculation of the first hash value. This is to prevent the login information from being leaked from the authentication server 10.

Note that although a timing at which the login information is deleted "after the calculation" is not specifically limited, the login information is liable to be leaked from the authentication server 10 if too long a time period has elapsed since the first hash value was calculated. Therefore, it is preferable to set the time period that elapses to be as short as possible. In the present embodiment, the timing at which the login information is deleted "after the calculation" may be designated by the service providing server 20.

In the present embodiment, the transmitting unit 12 creates an electronic mail 16 that shows the login information, and transmits the login information to the service providing server 20 with the created electronic mail 16. In the present embodiment, although a method for transmitting the login information performed by the transmitting unit 12 is not specifically limited, use of electronic mail 16 can reduce the costs for establishing the authentication system 100. Also, it is preferable that the transmitting unit 12 transmit an electronic mail 16 that is encrypted.

Also, in the present embodiment, when the user requests authentication via the terminal 30, the information input unit 11 can transmit to the terminal 30 a preset service ID and let the user return the service ID together with the login information. Specifically, the information input unit 11 displays a login page 31 in which the service ID is embedded. Then, when the user clicks a login button on the login page 31, the service ID is returned together with the ID and the password that were input.

In the case of the service ID being used, the storage unit 15 manages service IDs, user IDs, and session IDs in association with each other (see FIG. 2). FIG. 2 is a diagram showing an example of a table for managing service IDs, user IDs, and session IDs for use in the present embodiment in association with each other. Then, the transmitting unit 12 transmits the service ID in addition to the login information to the service providing server. The hash processing unit 13 calculates the first hash value from the login information and the service ID. Further, the hash value calculating unit 22 of the service providing server 20 calculates the second hash value from the login information and the service ID.

Also, in the case of the service ID being used, the authentication server 10 transmits in advance to the service providing server 20 services ID to be used. In the present embodiment, the service providing server 20 includes a storage unit 24, and the services ID transmitted in advance are registered in the storage unit 24. Note that the storage unit 24 may be realized by a database that is connected to the service providing server 20.

In the case of the authentication of the user, the service providing server 20 determines, when the service ID has been transmitted from the authentication server 10, whether or not the transmitted service ID is registered. When the result of the determination shows that the transmitted service ID is not registered, the service providing server 20 does not accept the authentication, and rejects to provide the terminal 30 with a service. This prevents attack by a spoofed email.

Also in the present embodiment, for each user ID serving as the login information, a password that corresponds to the user ID and another ID that is associated with the user ID may be stored in the storage unit 24. In this case, the login information determination unit 21 first determines whether or not the user ID transmitted as the login information is associated with the other ID stored in the storage unit 24. Then, the login information determination unit 21 also determines whether or not the password transmitted as the login information matches the password stored in the storage unit 24.

If the login information determination unit 21 has determined that the transmitted user ID is associated with the other ID, and the transmitted password matches the stored password, then the hash value calculating unit 22 calculates the second hash value from the login information using the hash function.

Hereinafter, a specific example will be described, with reference to FIG. 3. In this example, a table shown in FIG. 3 is stored in the storage unit 24. FIG. 3 is a diagram showing an example of a table for managing user IDs, passwords, and other IDs for use in the present embodiment.

In the example of FIG. 3, a user nickname or the like is used as the user ID, and an employee ID of the user who is an employee of Company A is used as the other ID. In this case, the user logs in using his or her nickname or the like, and can be provided with a service if this nickname or the like is associated with the employee ID. In this manner, the user can access the intra-company server without inputting a very important ID, such as an employee ID, from outside the company. As a result, it is possible to enhance the cooperation between the intra-company server and the outside-company server, while ensuring the security of the intra-company server.

System Operation

Figure 4:
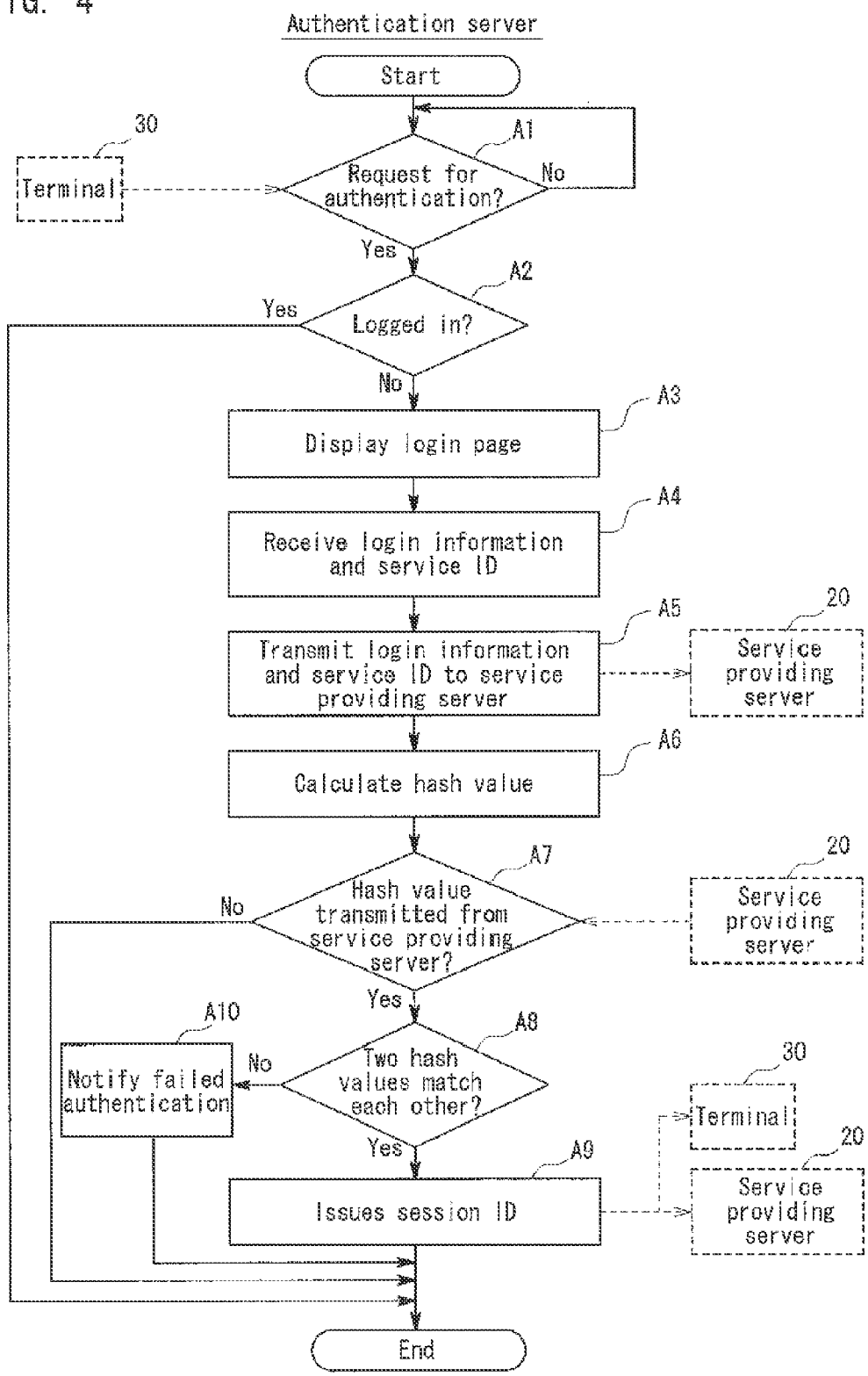
FIG. 4 is a flow diagram showing an operation of the authentication server of the present embodiment.
Figure 5:
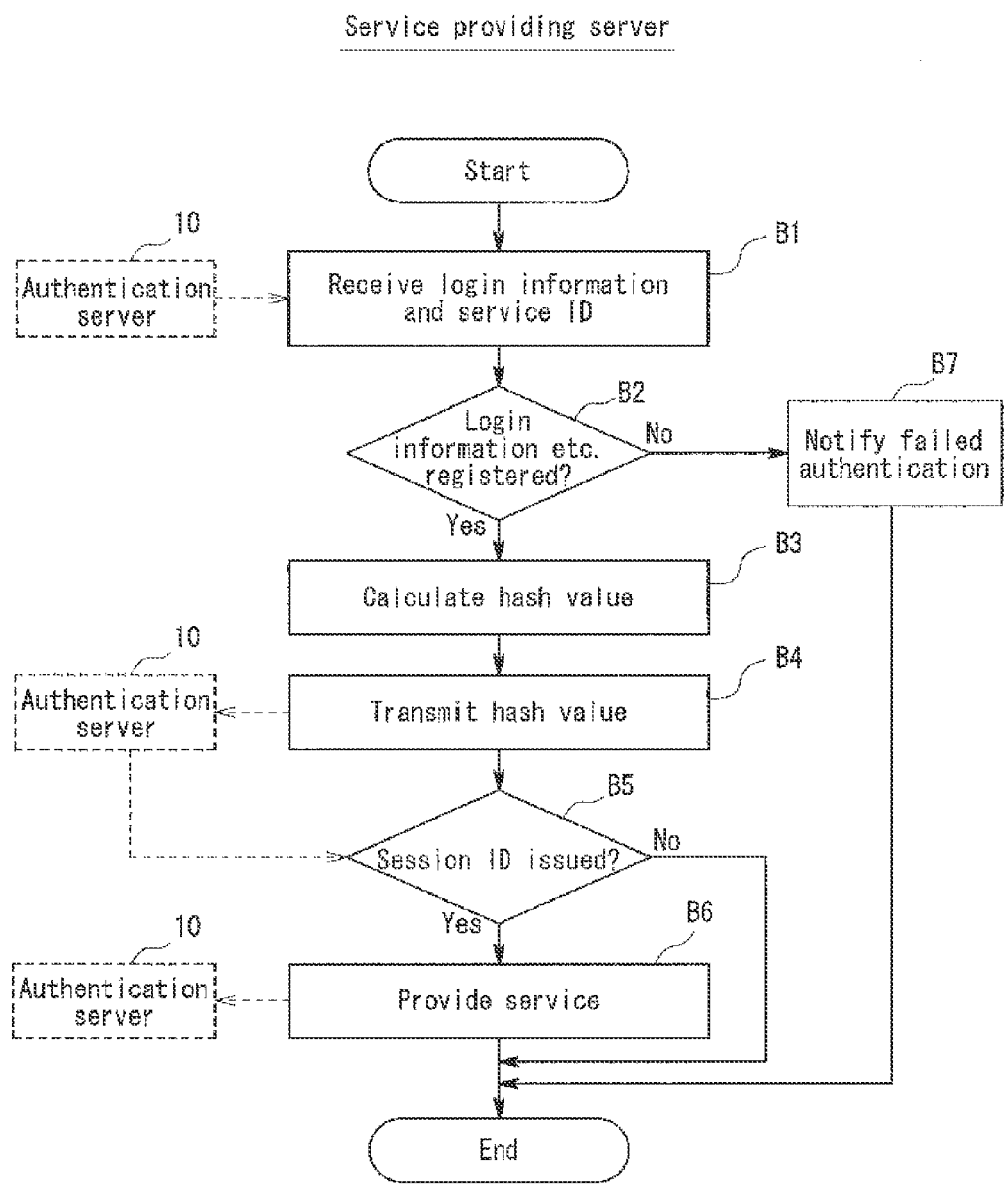
FIG. 5 is a flow diagram showing an operation of the service providing server of the present embodiment.

Hereinafter, operations of the authentication system 100, the authentication server 10, and the service providing server 20 of the embodiment of the present invention will be described, with reference to FIGS. 4 and 5. FIG. 4 is a flow diagram showing the operation of the authentication server of the present embodiment. FIG. 5 is a flow diagram showing the operation of the service providing server of the present embodiment. In the following explanation, FIGS. 1 to 3 are referenced as appropriate.

In the present embodiment, an authentication method is also implemented by the operations of the authentication server 10 and the service providing server 20, which constitute the authentication system 100. Accordingly, explanation of the authentication method in the present embodiment is replaced with the following explanation of the operations of the authentication server 10 and the service providing server 20. Hereinafter, the operation of the authentication server is first described with reference to FIG. 4, and then the operation of the service providing server is described with reference to FIG. 5.

Operation of Authentication Server

As shown in FIG. 4, in the authentication server 10, the information input unit 11 first determines whether or not authentication is requested by a user via the terminal 30 (Step A1). When the result of the determination in step A1 shows that no authentication is requested, the information input unit 11 enters a standby state. On the other hand, when the result of the determination in step A1 shows that authentication is requested, the information input unit 11 further determines whether or not the user who has requested the authentication in step A1 has already logged in (Step A2).

When the result of the determination in step A2 shows that the user has already logged in, the information input unit 11 displays on the screen of the terminal 30 the fact that the user has already logged in, and ends the processing. On the other hand, when the result of the determination in step A2 shows that the user has not yet logged in, the information input unit 11 displays the login page 31 on the screen of the terminal 30 (Step A3). In step A3, the information input unit 11 also embeds an arbitrary service ID into the login page 31.

Then, when the user inputs a user ID and a password on the login page 31, and clicks a login button, the information input unit 11 receives the user ID, the password, and the service ID, and causes the storage unit 15 to store them (Step A4).

After the execution of step A4, the transmitting unit 12 transmits to the service providing server 20 the user ID, the password, and the service ID that were received by the information input unit 11 (Step A5).

Then, the hash processing unit 13 acquires the user ID, the password, and the service ID stored in the storage unit 15, and calculate a hash value (first hash value) by substituting the user ID, the password, and the service ID into a predetermined hash function (Step A6). The hash processing unit 13 deletes the user ID, the password, and the service ID stored in the storage unit 15, at the same time as or after the execution of step A6.

After the execution of step A6, the hash processing unit 13 determines whether or not a hash value (second hash value) has been transmitted from the service providing server 20 (Step A7). When the result of the determination in step A7 shows that a hash value has not been transmitted from the service providing server 20, the hash processing unit 13 ends the processing on the condition that the service providing server 20 has transmitted a notification of an authentication failure.

On the other hand, when the result of the determination in step A7 shows that a hash value has been transmitted from the service providing server 20, the hash processing unit 13 determines whether or not the transmitted hash value and the hash value calculated in step A6 match each other (Step A8). When the result of the determination in step A8 shows that they match each other, the hash processing unit 13 instructs the session establishing unit 14 to execute step A9. On the other hand, when the result of the determination in step A8 shows that they do not match each other, the hash processing unit 13 instructs the session establishing unit 14 to execute step A10.

In step A9, the session establishing unit 14 issues a session ID, and establishes a session with the terminal 30. Also, the session establishing unit 14 writes the session ID into the table stored in the storage unit 15 (see FIG. 2), and transmits the session ID to the terminal 30.

Further, if a valid period has been set for the session, the session establishing unit 14 performs checking of the valid period after the execution of step A9. If the time period that has elapsed from the establishment of the session reaches the valid period, the session establishing unit 14 ends the session, and deletes the session ID from the table stored in the storage unit 15.

On the other hand, in step A10, the session establishing unit 14 notifies the terminal 30 of the failed authentication. With this measure, the screen of the terminal 30 indicates that the authentication failed. After the execution of step A9 or step A10, the processing in the authentication server 10 ends.

Operation of Service Providing Server

As shown in FIG. 5, in the service providing server 20, the login information determination unit 21 first receives the user ID, the password, and the service ID transmitted by the authentication server 10 (Step B1).

Next, the login information determination unit 21 determines whether or not the user ID, the password, and the service ID that were received in step B1 match the registered pieces of information (Step B2).

Specifically, the login information determination unit 21 extracts the table (FIG. 3) stored in the storage unit 24. Then, the login information determination unit 21 determines whether or not an employee ID that is associated with the received user ID is registered in the table, and whether or not the received password matches the password that is registered in the table. Further, the login information determination unit 21 also determines whether or not the received service ID matches a service ID registered in advance in the storage unit 24.

When the result of the determination in step B2 shows that the user ID, the password, and the service ID match registered pieces of information, the login information determination unit 21 causes the hash value calculating unit 22 to execute step B3. On the other hand, when the result of the determination in step B2 shows that the user ID, the password, and the service ID do not match registered pieces of information, the login information determination unit 21 notifies the authentication server 10 of the failed authentication (Step B7).

In step B3, the hash value calculating unit 22 calculates a hash value (second hash value) by assigning the user ID, the password, and the service ID that were received in step B1 to a predetermined hash function. Then, the value calculating unit 22 transmits the calculated hash value to the authentication server 10 (Step B4). Accordingly, in the authentication server, determination of whether the hash values match each other is performed (Step A8 shown in FIG. 4).

When the step B4 has been executed, the service providing unit 23 determines whether or not a session ID has been issued in the authentication server 10 (Step B5). When the result of the determination in step B5 shows that a session ID has been issued, the service providing unit 23 provides a service in accordance with the instruction of the user (Step B6). Then, when the provision of the service by the service providing unit 23 is completed, the processing in the service providing server 20 also ends. On the other hand, when the result of the determination in step B5 shows that a session ID has not been issued, the processing in the service providing server 20 directly ends.

As described above, in the present embodiment, the hash values are calculated independently in the authentication server 10 and in the service providing server 20, and a session is established on the condition that the two hash values match each other, enabling an improvement in security between the authentication server 10 and the service providing server 20. Also, since the login information is held on the authentication server only for a time period required for calculating a hash value, and it is further possible to ensure that the authentication server does not hold the important information, also in this view an improvement in security is achieved.

Therefore, when the service providing server 20 is an intra-company server and the authentication server 10 is an outside-company server, sufficient security is ensured even if an employee, that is, a user, accesses the intra-company server from outside the office via the terminal 30.

Examples of the program according to the embodiment of the present invention include a program for causing a computer to execute steps A1 to A10 shown in FIG. 4, and a program for causing a computer to execute steps B1 to B6 shown in FIG. 5.

By installing the former program into the computer and causing the computer to execute the program, it is possible to realize the authentication server 10 of the present embodiment. In this case, a Central Processing Unit (CPU) of the computer functions as the information input unit 11, the transmitting unit 12, the hash processing unit 13, and the session establishing unit 14, so as to perform the respective processes. Also, a storage device such as a memory or a hard disk that is provided in the computer functions as the storage unit 15.

Also, by installing the latter program into the computer and causing the computer to execute the program, it is possible to realize the service providing server 20 of the present embodiment. In this case, the CPU of the computer functions as the login information determination unit 21, the hash value calculating unit 22, and the service providing unit 23, so as to perform the respective processes. Also, a storage device such as a memory or a hard disk that is included in the computer functions as the storage unit 24.

Figure 6:
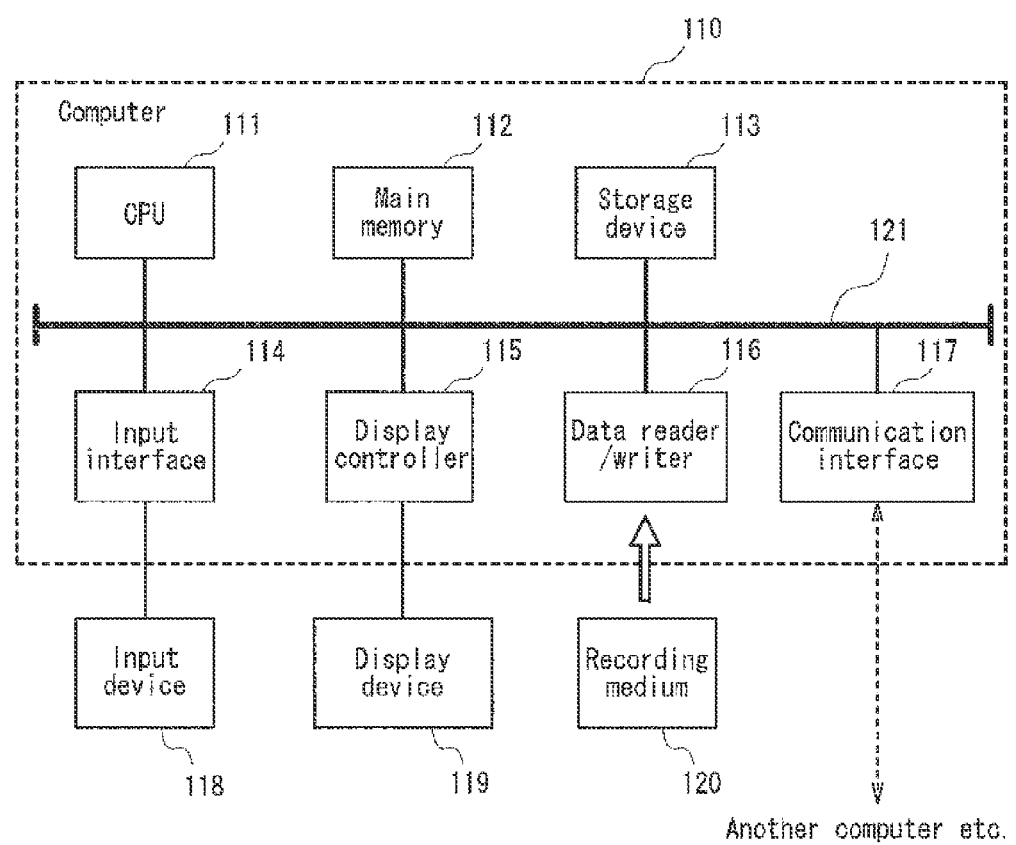
FIG. 6 is a block diagram showing an example of a computer that realizes the authentication server and the service providing server of the embodiment of the present invention.

The following describes a computer that realizes an authentication server and a service providing server by executing programs according to the embodiment, with reference to FIG. 6. FIG. 6 is a block diagram showing an example of a computer that realizes the authentication server and the service providing server according to the embodiment of the present invention.

As shown in FIG. 6, a computer 110 includes a CPU 111, a main memory 112, a storage device 113, an input interface 114, a display controller 115, a data reader/writer 116, and a communication interface 117. These components are connected by a bus 121 in such a manner that they can perform data communication with one another.

The CPU 111 performs various types of arithmetic operations by deploying programs (codes) of the embodiment stored in the storage device 113 to the main memory 112 and executing the deployed programs in a predetermined order. The main memory 112 is typically a volatile storage device such as a dynamic random-access memory (DRAM). The programs of the embodiment are provided in a state of being stored in a computer-readable recording medium 120. Note that the programs of the embodiment may be distributed over the Internet connected via the communication interface 117.

Specific examples of the storage device 113 include a hard disk and a semiconductor storage device such as a flash memory. The input interface 114 mediates data transmission between the CPU 111 and an input device 118 such as a keyboard and a mouse. The display controller 115 is connected to the display device 119 and controls display on the display device 119. The data reader/writer 116 mediates data transmission between the CPU 111 and the recording medium 120. More specifically, the data reader/writer 116 reads programs from the recording medium 120 and writes the results of processing executed by the computer 110 to the recording medium 120. The communication interface 117 mediates data transmission between the CPU 111 and other computers.

Specific examples of the recording medium 120 include a general-purpose semiconductor storage device such as CompactFlash (CF) and Secure Digital (SD) cards, a magnetic storage medium such as a flexible disk, and an optical storage medium such as a Compact Disc Read-Only Memory (CD-ROM).

A part or all of the above embodiment can be represented by the following Notes 1 to 22, but is not limited thereto.

(Note 1)

An authentication system including:

an authentication server that performs authentication of a user via a terminal; and a service providing server that provides the user with a service via the terminal, wherein the authentication server is configured to let the user input login information via the terminal when the user requests the authentication via the terminal, to transmit to the service providing server the login information that was input, and to calculate a first hash value from the login information using a hash function, the service providing server is configured to determine whether or not the login information transmitted from the authentication server matches information that is registered in advance, and to calculate a second hash value from the login information using the same hash function if the login information matches the information registered in advance, and the authentication server establishes a session with the terminal if the first hash value and the second hash value match each other.

(Note 2)

The authentication system according to Note 1, wherein the login information includes a first identifier and a password, and the service providing server stores in advance, for each first identifier, a password that corresponds to the first identifier and a second identifier that is associated with the first identifier, and determines that the login information matches the information registered in advance, if the first identifier transmitted as the login information is associated with the stored second identifier and the password transmitted as the login information matches the stored password.

(Note 3)

The authentication system according to Note 1 or 2, wherein the authentication server stores the login information, calculates the first hash value from the stored login information, and deletes the stored login information, at the same time as or after the calculation of the first hash value.

(Note 4)

The authentication system according to any one of Notes 1 to 3, wherein the authentication server creates an electronic mail that shows the login information, and transmits the login information to the service providing server with the created electronic mail.

(Note 5)

The authentication system according to any one of Notes 1 to 4, wherein, when the user requests the authentication via the terminal, the authentication server transmits a preset service ID to the terminal, lets the user return the service ID together with the login information, further transmits the service ID in addition to the login information to the service providing server, and calculates the first hash value from the login information and the service ID, and the service providing server calculates the second hash value from the login information and the service ID.

(Note 6)

An authentication server that performs, via a terminal, authentication of a user who requests provision of a service from a service providing server, the authentication server including:

an information input unit configured to let the user input login information via the terminal when the user requests the authentication via the terminal;

a transmitting unit configured to transmit to the service providing server the login information that was input;

a hash processing unit configured to calculate a first hash value from the login information using a hash function;

a session establishing unit configured to establish a session with the terminal, wherein, when the service providing server has calculated a second hash value on the basis of the transmitted login information using the same hash function on the condition that the login information matches information that is registered in advance, the hash processing unit determines whether or not the first hash value and the second hash value match each other, the session establishing unit establishes the session if the hash processing unit determines that the first hash value and the second hash value match each other.

(Note 7)

The authentication server according to Note 6, further including:

a storage unit for storing the login information, wherein the hash processing unit calculates the first hash value from the login information stored in the storage unit, and deletes the login information from the storage unit, at the same time as or after the calculation of the first hash value.

(Note 8)

The authentication server according to Note 6 or 7, wherein the transmitting unit creates an electronic mail that shows the login information, and transmits the login information to the service providing server with the created electronic mail.

(Note 9)

The authentication server according to any one of Notes 6 to 8, wherein, when the user requests the authentication via the terminal, the information input unit transmits a preset service ID to the terminal, and lets the user return the service ID together with the login information, the transmitting unit transmits the service ID in addition to the login information to the service providing server, the hash processing unit calculates the first hash value from the login information and the service ID and determines, when the service providing server has calculated the second hash value from the login information and the service ID, whether or not the first hash value and the second hash value match each other.

(Note 10)

A service providing server that provides a user with a service via a terminal when an authentication server has established a session with the terminal, the service providing server including:

a login information determination unit configured to determine, when login information that was input via the terminal has been transmitted from the authentication server, whether or not the login information matches information that is registered in advance;

a hash value calculating unit configured to calculate a hash value from the login information using a hash function if the login information determination unit determines that the login information matches the information registered in advance; and a service providing unit configured to provide the user with a service via the terminal when the authentication server has established a session with the terminal on the condition that the hash value calculated by the hash value calculating unit matches a hash value that is calculated by the authentication server from the login information using the same hash function.

(Note 11)

The service providing server according to Note 10, wherein the login information includes a first identifier and a password, the service providing server further includes a storage unit for storing, for each first identifier, a password that corresponds to the first identifier and a second identifier that is associated with the first identifier, the login information determination unit determines that the login information matches information that is registered in advance, if the first identifier transmitted as the login information is associated with the second identifier stored in the storage unit and the password transmitted as the login information matches the password stored in the storage unit.

(Note 12)

An authentication method using an authentication server that performs authentication of a user via a terminal, and a service providing server that provides the user with a service via the terminal, the method including the steps of (a) the authentication server letting the user input login information via the terminal when the user requests the authentication via the terminal;

(b) the authentication server transmitting to the service providing server the login information that was input;

(c) the authentication server calculating a first hash value using a hash function from the login information that was input;

(d) the service providing server determining whether the login information matches information that is registered in advance, and calculating a second hash value from the login information using the same hash function if the login information matches the information registered in advance; and (e) the authentication server establishing a session with the terminal if the first hash value calculated in step (c) matches the second hash value calculated in step (d).

(Note 13)

The authentication method according to Note 12, wherein the login information includes a first identifier and a password, the method further including the step of (f) the service providing server storing, for each first identifier, a password that corresponds to the first identifier and a second identifier that is associated with the first identifier, wherein, in step (d), the service providing server determines that the login information matches information that is registered in advance, if the first identifier transmitted as the login information is associated with the stored second identifier and the password transmitted as the login information matches the stored password.

(Note 14)

The authentication method according to Note 12 or 13, wherein, in step (a), the authentication server stores the login information and, in step (c), the authentication server calculates the first hash value from the login information stored in step (a), and deletes the stored login information, at the same time as or after the calculation of the first hash value.

(Note 15)

The authentication method according to any one of Notes 12 to 14, wherein, in step (b), the authentication server creates an electronic mail that shows the login information, and transmits the login information to the service providing server with the created electronic mail.

(Note 16)

The authentication method according to any one of Notes 12 to 15, wherein, in step (a), the authentication server transmits a preset service ID to the terminal when the user requests the authentication via the terminal, and lets the user return the service ID together with the login information, in step (b), the authentication server transmits the service ID in addition to the login information to the service providing server, in step (c), the authentication server calculates the first hash value from the login information and the service ID, and in step (d), the service providing server calculates the second hash value from the login information and the service ID.

(Note 17)

A computer-readable recording medium having recorded therein a program for causing a computer to perform, via a terminal, authentication of a user who requests a service from a service providing server, the program including instructions for causing the computer to execute the steps of (a) letting the user input login information via the terminal when the user requests the authentication via the terminal;

(b) transmitting to the service providing server the login information that was input in step (a);

(c) calculating a first hash value using a hash function from the login information that was input in step (a);

(d) determining, when the service providing server has calculated a second hash value on the basis of the transmitted login information using the same hash function on the condition that the login information matches information that is registered in advance, whether or not the first hash value calculated in step (c) and the second hash value calculated by the service providing server match each other; and (e) establishing a session with the terminal if it is determined in step (d) that the first hash value and the second hash value match each other.

(Note 18)

The computer-readable recording medium according to Note 17, wherein, in step (a), the login information is stored, in step (c), the first hash value is calculated from the stored login information, and the stored login information is deleted, at the same time as or after the calculation of the first hash value.

(Note 19)

The computer-readable recording medium according to Note 17 or 18, wherein, in step (b), an electronic mail that shows the login information is created, and the login information is transmitted to the service providing server with the created electronic mail.

(Note 20)

The computer-readable recording medium according to any one of Notes 17 to 19, wherein, in step (a), a preset service ID is transmitted to the terminal when the user requests the authentication via the terminal, the service ID is returned together with the login information by the user, in step (b), the service ID is transmitted in addition to the login information to the service providing server, in step (c), the first hash value is calculated from the login information and the service ID, and in step (d), when the service providing server has calculated the second hash value from the login information and the service ID, it is determined whether or not the first hash value and the second hash value match each other.

(Note 21)

A computer-readable recording medium having recorded therein a program for causing a computer to provide a user with a service via a terminal when an authentication server has established a session with the terminal, the program including instructions for causing the computer to execute the steps of (a) determining, when login information that was input via the terminal has been transmitted from the authentication server, whether or not the login information matches information that is registered in advance;

(b) calculating a hash value from the login information using a hash function if it is determined in step (a) that the login information matches the information registered in advance; and (c) providing the user with a service via the terminal when the authentication server has established a session with the terminal on the condition that the hash value calculated in the step (b) matches a hash value that is calculated by the authentication server from the login information using the same hash function.

(Note 22)

The computer-readable recording medium according to Note 21, wherein the login information includes a first identifier and a password, the program further including an instruction for causing the computer to execute the step of:

(d) storing, for each first identifier, a password that corresponds to the first identifier and a second identifier that is associated with the first identifier, wherein, in step (a), it is determined that the login information matches the information registered in advance, if the first identifier transmitted as the login information is associated with the second identifier stored in step (d) and the password transmitted as the login information matches the password stored in step (d).

Although the invention of the present application has been described using the above embodiment, the invention of the present application is by no means limited to the above embodiment. The configurations and details of the invention of the present application may be subjected to various changes that can be understood by a person skilled in the art within a scope of the invention of the present application.

The present application claims the benefit of priority from Japanese Patent Application No. 2010-280637, filed Dec. 16, 2010, the disclosure of which is hereby incorporated by reference in its entirety.

Industrial Applicability

According to the present invention, as described above, it is possible to enhance security between an authentication server and a server for providing a service. Therefore, the present invention is useful specifically when a company utilizes cloud computing with an intra-company server cooperating with an outside-company server.

Descriptions of Reference Numerals

10 Authentication server
11 Information input unit
12 Transmitting unit
13 Hash processing unit
14 Session establishing unit
15 Storage unit
16 Electronic mail
20 Service providing server
21 Login information determination unit
22 Hash value calculating unit
23 Service providing unit
24 Storage unit
30 Terminal
100 Authentication system
110 Computer
111 CPU
112 Main memory
113 Storage device
114 Input interface
115 Display controller
116 Data reader/writer
117 Communication interface
118 Input device
119 Display device
120 Recording medium
121 Bus

The invention claimed is:

1. An authentication system comprising:

an authentication server that performs authentication of a user via a terminal; and a service providing server that provides the user with a service via the terminal, wherein the authentication server is configured to let the user input login information via the terminal when the user requests the authentication via the terminal, to transmit to the service providing server the login information that was input, and to calculate a first hash value from the login information using a hash function, the service providing server is configured to determine whether or not the login information transmitted from the authentication server matches information that is registered in advance, and to calculate a second hash value from the login information using the same hash function if the login information matches the information registered in advance, and the authentication server establishes a session with the terminal if the first hash value and the second hash value match each other, wherein, when the user requests the authentication via the terminal, the authentication server transmits a preset service ID to the terminal, lets the user return the service ID together with the login information, further transmits the service ID in addition to the login information to the service providing server, and calculates the first hash value from the login information and the service ID, and the service providing server calculates the second hash value from the login information and the service ID.

2. The authentication system according to claim 1,
wherein the login information includes a first identifier and a password, and
the service providing server stores in advance, for each first identifier, a password that corresponds to the first identifier and a second identifier that is associated with the first identifier, and determines that the login information matches the information registered in advance, if the first identifier transmitted as the login information is associated with the stored second identifier and the password transmitted as the login information matches the stored password.

3. The authentication system according to claim 1,
wherein the authentication server stores the login information, calculates the first hash value from the stored login information, and deletes the stored login information, at the same time as or after the calculation of the first hash value.

4. The authentication system according to claim 1,
wherein the authentication server creates an electronic mail that shows the login information, and transmits the login information to the service providing server with the created electronic mail.

5. An authentication server that performs, via a terminal, authentication of a user who requests provision of a service from a service providing server, the authentication server comprising:
an information input unit configured to let the user input login information via the terminal when the user requests the authentication via the terminal;
a transmitting unit configured to transmit to the service providing server the login information that was input;
a hash processing unit configured to calculate a first hash value from the login information using a hash function;
a session establishing unit configured to establish a session with the terminal,
wherein, when the service providing server has calculated a second hash value on the basis of the transmitted login information using the same hash function on the condition that the login information matches information that is registered in advance, the hash processing unit determines whether or not the first hash value and the second hash value match each other,
the session establishing unit establishes the session if the hash processing unit determines that the first hash value and the second hash value match each other,
wherein, when the user requests the authentication via the terminal, the information input unit transmits a preset service ID to the terminal, and lets the user return the service ID together with the login information,
the transmitting unit transmits the service ID in addition to the login information to the service providing server,
the hash processing unit calculates the first hash value from the login information and the service ID and determines, when the service providing server has calculated the second hash value from the login information and the service ID, whether or not the first hash value and the second hash value match each other.

6. An authentication method using an authentication server that performs authentication of a user via a terminal, and a service providing server that provides the user with a service via the terminal, the method including the steps of:
(a) the authentication server letting the user input login information via the terminal when the user requests the authentication via the terminal;
(b) the authentication server transmitting to the service providing server the login information that was input;
(c) the authentication server calculating a first hash value using a hash function from the login information that was input;
(d) the service providing server determining whether the login information matches information that is registered in advance, and calculating a second hash value from the login information using the same hash function if the login information matches the information registered in advance; and
(e) the authentication server establishing a session with the terminal if the first hash value calculated in step (c) matches the second hash value calculated in step (d),
wherein, in step (a), the authentication server transmits a preset service ID to the terminal when the user requests the authentication via the terminal, and lets the user return the service ID together with the login information,
in step (b), the authentication server transmits the service ID in addition to the login information to the service providing server,
in step (c), the authentication server calculates the first hash value from the login information and the service ID, and
in step (d), the service providing server calculates the second hash value from the login information and the service ID.

7. A non-transitory computer-readable recording medium having recorded therein a program for causing a computer to perform, via a terminal, authentication of a user who requests a service from a service providing server, the program including instructions for causing the computer to execute the steps of:
(a) letting the user input login information via the terminal when the user requests the authentication via the terminal;
(b) transmitting to the service providing server the login information that was input in step (a);
(c) calculating a first hash value using a hash function from the login information that was input in step (a);
(d) determining, when the service providing server has calculated a second hash value on the basis of the transmitted login information using the same hash function on the condition that the login information matches information that is registered in advance, whether or not the first hash value calculated in step (c) and the second hash value calculated by the service providing server match each other; and
(e) establishing a session with the terminal if it is determined in step (d) that the first hash value and the second hash value match each other,
wherein, in step (a), a preset service ID is transmitted to the terminal when the user requests the authentication via the terminal, the service ID is returned together with the login information by the user,
in step (b), the service ID is transmitted in addition to the login information to the service providing server,
in step (c), the first hash value is calculated from the login information and the service ID, and
in step (d), when the service providing server has calculated the second hash value from the login information and the service ID, it is determined whether or not the first hash value and the second hash value match each other.

8. The authentication server according to claim 5, further comprising:
a storage unit for storing the login information,
wherein the hash processing unit calculates the first hash value from the login information stored in the storage unit, and deletes the login information from the storage unit, at the same time as or after the calculation of the first hash value.

9. The authentication server according to claim 5,
wherein the transmitting unit creates an electronic mail that shows the login information, and transmits the login information to the service providing server with the created electronic mail.

10. The authentication method according to claim 6,
wherein the login information includes a first identifier and a password, the method further including the step of:
(f) the service providing server storing, for each first identifier, a password that corresponds to the first identifier and a second identifier that is associated with the first identifier,
wherein, in step (d), the service providing server determines that the login information matches information that is registered in advance, if the first identifier transmitted as the login information is associated with the stored second identifier and the password transmitted as the login information matches the stored password.

11. The authentication method according to claim 6,
wherein, in step (a), the authentication server stores the login information and,
in step (c), the authentication server calculates the first hash value from the login information stored in step (a), and deletes the stored login information, at the same time as or after the calculation of the first hash value.

12. The authentication method according to claim 6,
wherein, in step (b), the authentication server creates an electronic mail that shows the login information, and transmits the login information to the service providing server with the created electronic mail.

13. The non-transitory computer-readable recording medium according to claim 7,
wherein, in step (a), the login information is stored,
in step(c), the first hash value is calculated from the stored login information, and the stored login information is deleted, at the same time as or after the calculation of the first hash value.

14. The non-transitory computer-readable recording medium according to claim 7,
wherein, in step (b), an electronic mail that shows the login information is created, and the login information is transmitted to the service providing server with the created electronic mail.

* * * * *